United States Patent
Onkar et al.

(10) Patent No.: US 10,536,308 B2
(45) Date of Patent: Jan. 14, 2020

(54) AUTOMATIC GAIN CONTROL (AGC) ASSISTED CARRIER OFFSET CORRECTION

(71) Applicant: Analog Devices Global Unlimited Company, Hamilton (BM)

(72) Inventors: Sudarshan Onkar, Bangalore (IN); Michael O'Brien, Munster (IE)

(73) Assignee: Analog Devices Global Unlimited Company, Hamilton (BM)

( * ) Notice: Subject to any disclaimer, the term of this patent is extended or adjusted under 35 U.S.C. 154(b) by 0 days.

(21) Appl. No.: 15/784,747

(22) Filed: Oct. 16, 2017

(65) Prior Publication Data

US 2019/0116073 A1    Apr. 18, 2019

(51) Int. Cl.
*H04L 27/00* (2006.01)
*H04B 1/16* (2006.01)

(52) U.S. Cl.
CPC ............ *H04L 27/0014* (2013.01); *H04B 1/16* (2013.01); *H04L 2027/003* (2013.01)

(58) Field of Classification Search
CPC .. H04L 27/0014; H04L 2027/003; H04B 1/16
See application file for complete search history.

(56) References Cited

U.S. PATENT DOCUMENTS

| 7,274,758 B1 | 9/2007 | Zhou et al. | |
| 8,204,466 B2 | 6/2012 | Aytur | |
| 2017/0230145 A1* | 8/2017 | Gore | H04W 52/0245 |

OTHER PUBLICATIONS

"802.15.4q-2016—IEEE Standard for Low-Rate Wireless Networks—Amendment 2: Ultra-low Power Physical Layer," Apr. 29, 2016, IEEE, https://ieeexplore.ieee.org/document/7466448 , accessed on Oct. 14, 2018 (Year: 2016).*
Liu, Yao-Hong, "A 3.7mW-RX 4.4mW-TX Fully Integrated Bluetooth Low-Energy/IEEE802.15.4/Proprietary SoC with an ADPLL-Based Fast Frequency Offset Compensation in 40nm CMOS", 2015 IEEE International Solid-State Circuits Conference, (2015), 235-237.

* cited by examiner

*Primary Examiner* — David S Huang
(74) *Attorney, Agent, or Firm* — Schwegman Lundberg & Woessner, P.A.

(57) ABSTRACT

In a communication receiver circuit, an amplifier circuit can include an adjustable gain. A signal corresponding to a portion of a transmitted frame can be received, and a gain of the receiver circuit can be adjusted such as automatically, and such adjustment can be referred to as automatic gain control (AGC). An offset correction can be performed to adjust for an error in a received representation of a transmitted carrier, and such offset correction can be referred to as carrier frequency offset (CFO) correction. A portion of the received signal can be dynamically allocated between AGC and CFO correction, such as allocating a longer duration to CFO correction when AGC results in a relatively higher receiver gain, and allocating a shorter duration to CFO correction when AGC results in a relatively lower receiver gain.

21 Claims, 6 Drawing Sheets

AUTOMATIC GAIN CONTROL (AGC) ASSISTED CARRIER OFFSET CORRECTION

FIELD OF THE DISCLOSURE

This document pertains generally, but not by way of limitation, to a communication receiver circuit and more particularly, to circuits and techniques for performing automatic gain control (AGC) and carrier frequency offset (CFO) compensation.

BACKGROUND

In a communication receiver circuit, a control scheme can be implemented including digital and analog elements. Such a control scheme can be referred to as a mixed-signal scheme. For example, a signal "chain" to process a received signal generally includes one or more amplifier circuits, such as having an adjustable gain. The gain can be adjusted automatically, and such automatic adjustment can be referred to as automatic gain control (AGC). In a communication scheme where frequency modulation or digital frequency-shift keying (FSK) is used, a difference between a channel center frequency or carrier frequency used for transmission and a local oscillator frequency used with a mixer for downconversion or other purposes can create an unwanted error in a demodulated signal. An offset correction can be performed to compensate for such an error, and such a scheme can be referred to as a carrier frequency offset (CFO) correction scheme. The receiver circuit can be included as a portion of a circuit including a transmitter, and the combination of receiver and transmitter can be referred to generally as a transceiver circuit.

SUMMARY OF THE DISCLOSURE

A communication receiver circuit can be configured for operation according to one or more wireless standards. As mentioned above, the receiver can be included as a portion of a transceiver circuit. For example, a portion or an entirety of a transmitter circuit and a receiver circuit can be co-integrated within a commonly-shared integrated circuit package. An integrated transceiver can be included as a node in a wireless network, such as a body area network (BAN). In an example, the integrated transceiver can be operated in a manner providing communication in proximity to a patient's body for use in telemetering of data from or between medical sensing or monitoring devices, such as coupling one or more medical sensing or monitoring devices together or to other equipment located elsewhere. In one approach, a frequency-shift-keying (FSK) modulation technique can be used, such as Gaussian Frequency Shift Keying (GFSK), such as provided by a power-efficient transceiver to support a BAN.

As mentioned above, a communication receiver circuit can include an amplifier circuit having an adjustable gain. A signal corresponding to a portion of a transmitted frame can be received, and a gain of the receiver circuit can be adjusted automatically, to provide automatic gain control (AGC). An offset correction can be performed to adjust for an error in a received representation of a transmitted carrier frequency or center frequency, and such offset correction can generally be referred to as carrier frequency offset (CFO) correction. A portion of the received signal can be dynamically allocated between AGC and CFO correction. As an illustrative example, a longer portion of a received preamble can be allocated to CFO correction when AGC results in a relatively higher receiver gain, and a shorter duration of the received preamble can be allocated to CFO correction when AGC results in a relatively lower receiver gain.

According to an example, a method for efficient carrier frequency offset (CFO) compensation in a digital communication receiver circuit can include receiving a signal corresponding to a transmitted frame including a preamble, dynamically allocating a portion of a duration of the preamble to performing an automatic gain adjustment, and dynamically allocating another different portion of the duration of the preamble to performing a carrier frequency offset compensation.

In an example, an apparatus, such as a circuit, can be used to perform one or more techniques described herein. According to an example, such as a circuit can include a receiver circuit for a communication system having an adjustable receive gain and a received carrier frequency offset correction scheme, the receiver circuit including an amplifier circuit configured to receive a signal corresponding to a transmitted frame, an analog-to-digital converter circuit communicatively coupled to the amplifier circuit, a phase detection circuit coupled to an output of analog-to-digital converter circuit, an automatic gain control (AGC) circuit coupled to the amplifier circuit and configured to automatically adjust a gain of the amplifier circuit using information obtained from a first portion of the signal received by the amplifier circuit, and a carrier frequency offset (CFO) compensation circuit configured to adjust an output of the phase detection circuit using information obtained from a second portion of the signal received by the amplifier circuit. The AGC circuit can be configured to dynamically establish a first duration corresponding to the first portion, and wherein the CFO compensation circuit is configured to dynamically establish a second duration corresponding to the second portion of the received signal in response to the dynamically-established first duration.

This summary is intended to provide an overview of subject matter of the present patent application. It is not intended to provide an exclusive or exhaustive explanation of the invention. The detailed description is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

As mentioned above, a receiver circuit can be configured to support automatic gain control (AGC) adjustment and carrier frequency offset (CFO) compensation. CFO compensation can also be referred to as automatic frequency control (AFC). When a frame of information is transmitted from elsewhere, a receiver circuit, such as included as a portion of a transceiver circuit, can detect an initial portion of the transmitted frame or other information and dynamically allocate time between performing AGC and CFO compensation. As an illustrative example, the AGC behavior of the transceiver can include receiving a signal indicative of an incoming frame, performing AGC by establishing an initial gain at a relatively higher or the highest gain setting, and then determining whether the gain setting is appropriate. If the gain setting is appropriate, then a control circuit can promptly trigger CFO compensation to occur. If the gain setting is inappropriate, such as causing clipping or distortion of the received signal, the AGC gain can be reduced.

Once an appropriate gain setting is identified, the CFO compensation can be triggered, but a duration used for CFO compensation can be shortened in response to the longer duration over which AGC was performed. The present inventors have recognized that such an approach can be used to rapidly perform both AGC and CFO compensation, such as within a fixed or limited duration corresponding to a preamble of a received frame or other training sequence, as illustrative examples. Such operation can one or more of reduce a frame error rate or enhance receiver sensitivity. The CFO compensation can include a feed-forward approach where an offset correction is applied downstream in the communication signal chain. In addition, or instead, the CFO compensation can include a feedback topology where an offset correction is applied upstream in the communication signal chain, such as to correct a local oscillator (LO) frequency used for downconversion, for example. A delayed representation of the offset-corrected received signal can be provided to synchronization and detection circuitry for conversion to a digital representation of the received information.

Figure 1A:
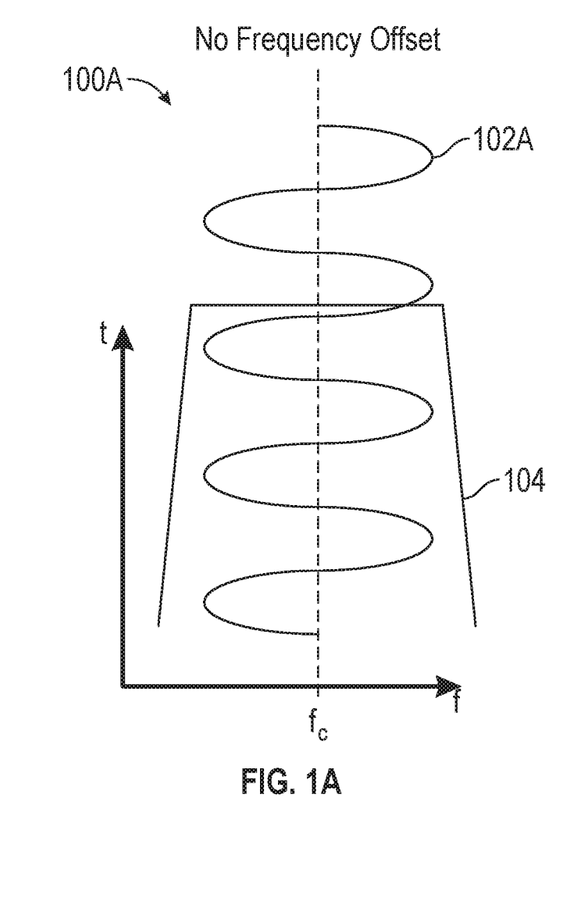
FIG. 1A illustrates generally an example of an alignment of a center frequency of a transmitted signal relative to a receiver circuit input filter pass-band, when no frequency offset error is present.
Figure 1B:
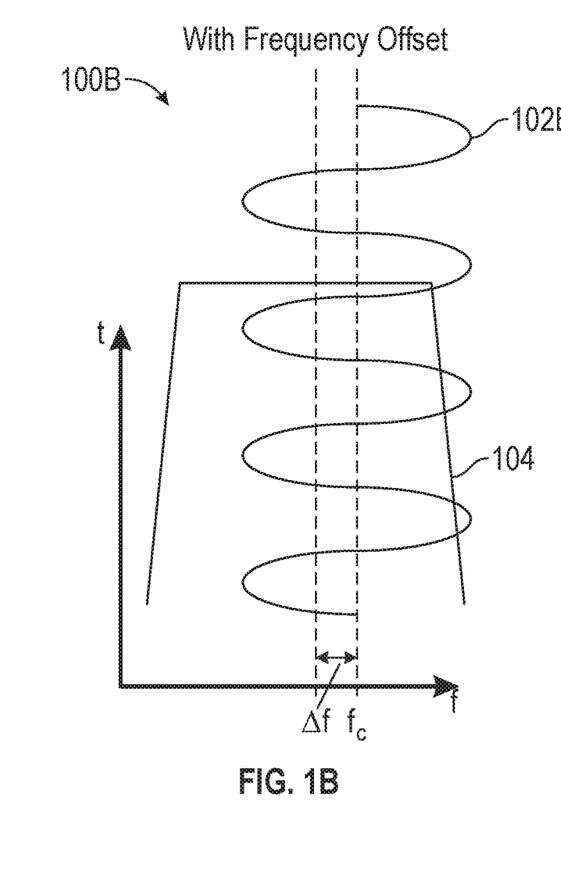
FIG. 1B illustrates generally an example, similar to FIG. 1A, but wherein the center frequency of the received signal is offset relative to a receiver circuit input filter pass-band.

FIG. 1A illustrates generally an example 100A of an alignment of a center frequency "$f_c$," of a transmitted signal 102A, relative to a receiver circuit input filter pass-band 104, when no frequency offset error is present. The input filter pass-band can represent the combined filter responses of one or more analog or digital filters located in the receive signal chain, such as including one or more of a baseband filter and a channelization filter. FIG. 1B illustrates generally an example 100B, similar to FIG. 1A, but wherein the center frequency "$f_c$," of another received signal 102B is offset (e.g., by "$\Delta f$") relative to the receiver circuit input filter pass-band 104. As mentioned elsewhere herein, one or more of a feed-forward or a feedback approach can be used to compensate for the offset, "$\Delta f$." For example, if a feedback approach is used, a local oscillator frequency produced by a frequency synthesizer can be shifted to re-center $f_c$. The signal 102B is generally demodulated to provide a time-varying signal whose amplitude varies as a function of the frequency deviation of the signal 102B. If a feed-forward approach is used the frequency offset compensation can be applied as an amplitude correction to the signal, such as to provide a direct-current (e.g., DC-valued) shift in the demodulated signal, prior to detection and decoding.

Figure 2:
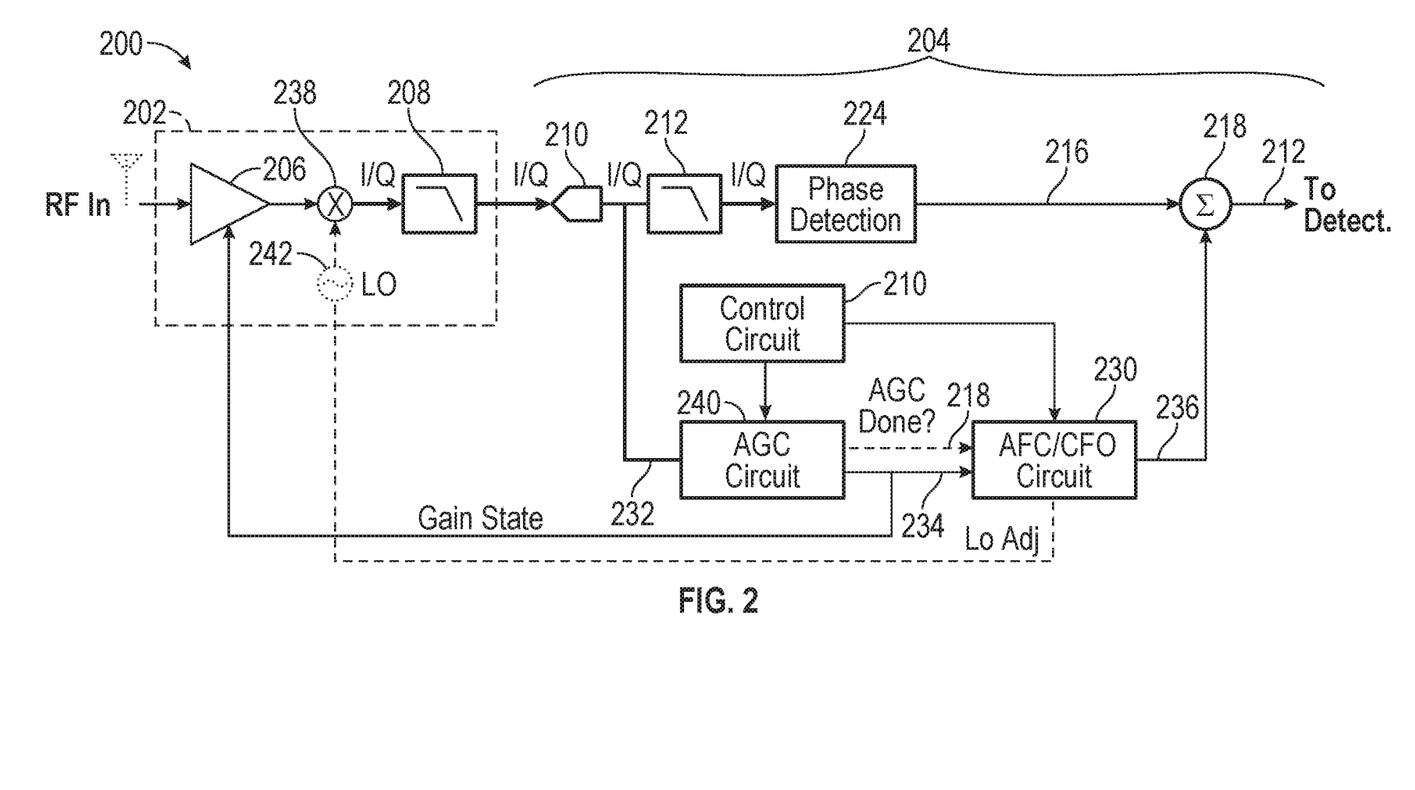
FIG. 2 illustrates generally an example of a receiver circuit that can include circuits for performing automatic gain control and automatic frequency correction (AFC)/carrier frequency offset (CFO) compensation, such as can provide dynamically-allocated durations for AFC and CFO compensation.

FIG. 2 illustrates generally an example of a receiver circuit 200 that can include circuits for performing automatic gain control and automatic frequency correction (AFC)/carrier frequency offset (CFO) compensation, such as can provide dynamically-allocated durations for AFC and CFO compensation. In the example of FIG. 2, a receiver front-end circuit 202 can include one or more amplifier circuits such as an amplifier circuit 206, a mixer circuit 238, such as coupled to a local oscillator circuit 242, and one or more filters such as a base-band filter 208. Generally, in-phase and quadrature components (I/Q) are provided from the mixer circuit 238. The input to the mixer circuit 238 can be an RF signal received from the amplifier circuit 206 or may be an intermediate frequency signal provided from an output of another mixer circuit. While only a single line is shown from the mixer output, generally each of the downstream elements up to the phase detection circuit 224 can include pathways for both the in-phase signal component and the quadrature signal component.

The output of the baseband filter 208 can provide a baseband signal comprising in-phase and quadrature components, and such as can include information corresponding to one or multiple channels within the bandwidth of the baseband filter. An analog-to-digital converter circuit 210 can be used to convert in-phase and quadrature representations of the baseband signal into a digital or discrete-time representation. Downstream processing of the received signal can be performed in the digital domain as shown in the region 204. A channelization filter 212 can be implemented, such as a digital filter, to select a sub-band within the baseband signal corresponding to a particular channel. A phase detection circuit 224 can be used to convert a time-varying frequency of the received signal into a time-varying amplitude. For example, the phase detection can include a four-quadrant arc-tangent operation and a summing element. A control circuit 210 can be included, such as to control one or more other portions of the receive circuit 200. For example, the control circuit can be coupled to an AGC circuit 240 to perform automatic gain control.

A digital representation of the received signal 232 can be passed to the AGC circuit, such as for use in determining an appropriate gain state for the front-end 202 or other portions of the receiver circuit 200. For example, a gain state can be output from the AGC circuit such as to control the amplifier circuit 206 or other functional blocks of the receiver circuit 206. The control circuit can also be coupled to an AFC/CFO circuit 230. For example, the AFC/CFO 230 circuit can provide an offset compensation output 236 to be added to the demodulated received signal 216 at a summing element 218, to provide an offset-compensated demodulated signal. The output 212 of the summing element 218 can be provided to synchronization or detection circuitry, such as for detection and decoding of digital data represented by the offset-compensated demodulated signal 212. Various elements shown in the circuit 200 topology of FIG. 2 can be replicated to provide a multi-channel receiver.

As described in other examples herein, one or more of the control circuit 210, AGC circuit 240, or AFC/CFO circuit 230 can be used perform AGC and CFO by dynamically allocating respective portions of a received signal, such as a preamble of a received frame, to AGC and CFO. For example, the AGC circuit 240 can include a state machine circuit, and the AGC can provide a flag or other signal indicative of completion of AGC to the AFC/CFO circuit 236. The AFC/CFO circuit can then perform CFO compensation using a remaining duration of the specified portion of the received signal. The duration of CFO compensation determination can be varied depending on how much time is consumed performing AGC, such as shown illustratively in FIG. 3 and FIG. 4.

Information indicative of the gain state can be provided from the AGC circuit 240 or from the control circuit 210 to the AFC/CFO circuit 230. For example, if the information indicative of the gain state indicates that a relatively higher gain has been established during AGC, the AFC/CFO circuit 230 can provide a relatively longer duration for performing carrier frequency offset compensation. Similarly, if the information indicative of the gain state indicates that a relatively lower gain has been established during AGC, the AFC/CFO circuit 230 can provide a relatively shorter duration for performing carrier frequency offset compensation. Accordingly, a tradeoff can exist between AGC duration and CFO compensation duration. If AGC completion is used to trigger CFO compensation, the CFO compensation can be said to be "AGC-assisted."

Generally, the compensation output 236 from the AFC/CFO circuit can include information indicative of a fixed amplitude or level to be added to the demodulated received signal 216. This generally represents a feed-forward compensation topology. Optionally, in addition to or instead of using a feed-forward topology, a feedback topology can be used, such as to provide an adjustment signal to the front-end 202, such as a local oscillator (LO) adjustment ("LO Adj") coupled to the local oscillator circuit 242. For example, the feedback topology can be used to provide a coarse frequency offset correction at the LO 242, and a finer frequency offset correction can be performed using the compensation out 236.

Figure 3:
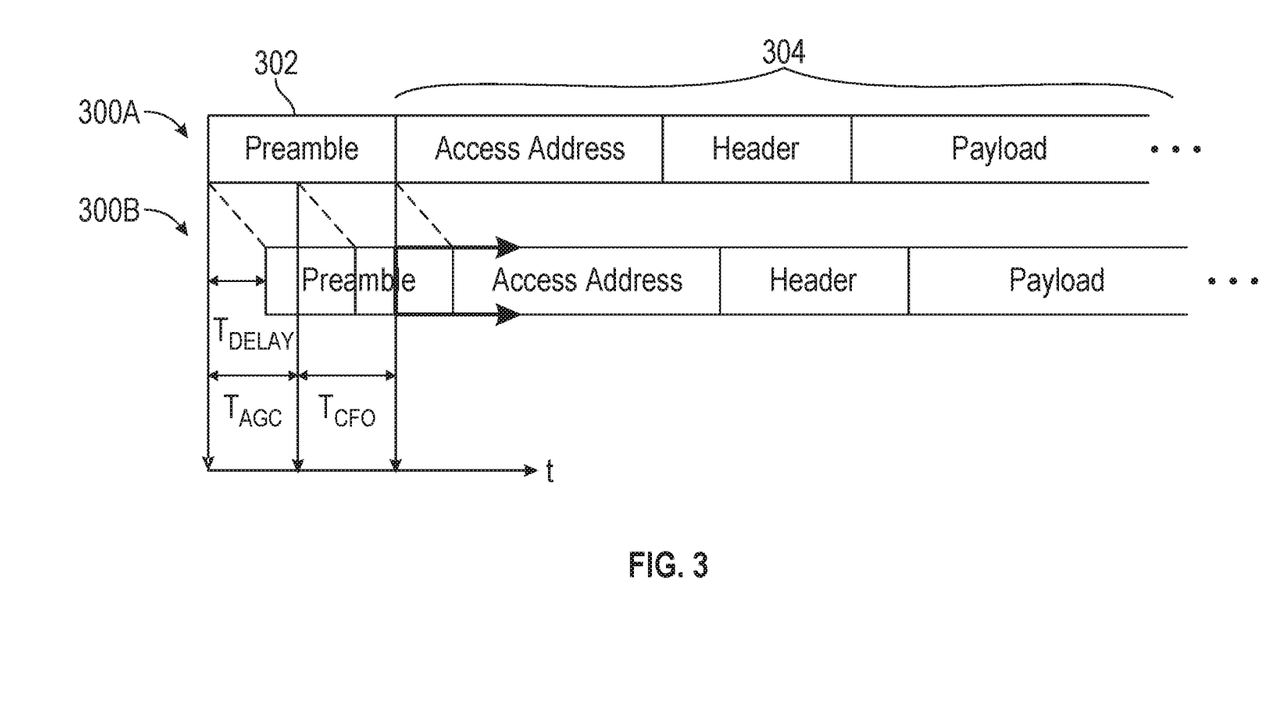
FIG. 3 illustrates generally an illustrative example of a transmitted frame, and corresponding durations allocated to automatic gain control (AGC) and carrier frequency offset (CFO) compensation, and a delayed representation of the transmitted frame.

FIG. 3 illustrates generally an illustrative example of a transmitted frame 300A, and a delayed representation of the transmitted frame 300B, and corresponding durations allocated to automatic gain control (AGC) and carrier frequency offset (CFO) compensation. The transmitted frame can include a logical representation of information transmitted using a Gaussian Frequency Shift Keying (GFSK) communication scheme according to a wireless communication standard, such as Bluetooth® Low Energy (BLE) as described in the Bluetooth Core Specification, v. 5.0, published Dec. 6, 2016, by the Bluetooth® Special interest Group, Kirkland, Wash.

Use of BLE is merely illustrative, and the techniques shown and described herein are generally applicable to other communication systems and standards, such as standardized or proprietary wireless communication schemes using GFSK modulation, as an illustrative example. In FIG. 3, receipt of a signal such as including a preamble 302 or a portion of the signal even before the preamble 302 can trigger a receive circuit to perform automatic gain control (AGC). For example, the receiver may be configured to power up the front-end circuit to listen for the presence of a signal, and if a received signal exceeds a threshold indicating the presence of a received signal, the receiver may initiate AGC to establish a gain state of the front-end circuit. A portion of the preamble 302 allocated to AGC can be referred to as $T_{AGC}$. $T_{AGC}$ can be dynamic, that is, $T_{AGC}$ can be varied within a single receive instance depending on the gain established by the AGC operation. For example, if the gain state is initially set to the highest receiver gain (e.g., maximum sensitivity) and this gain state is determined as the appropriate state (e.g., no clipping or distortion detected) where AGC can be regarded as complete, $T_{AGC}$ terminates, and carrier frequency offset compensation can be performed for a remainder of the fixed preamble 302 duration, such as noted as $T_{CFO}$.

The delayed representation of the frame 300B can be provided downstream to detection or decoding blocks, such as to ensure that information 304 other than the preamble 304 is received at the detection or decoding block with the appropriate carrier frequency offset compensation applied. The delay interval, $T_{DELAY}$, can be established such as to avoid distortion or error in decoding of the access address, header, or payload, for example, as shown in FIG. 3.

Figure 4:
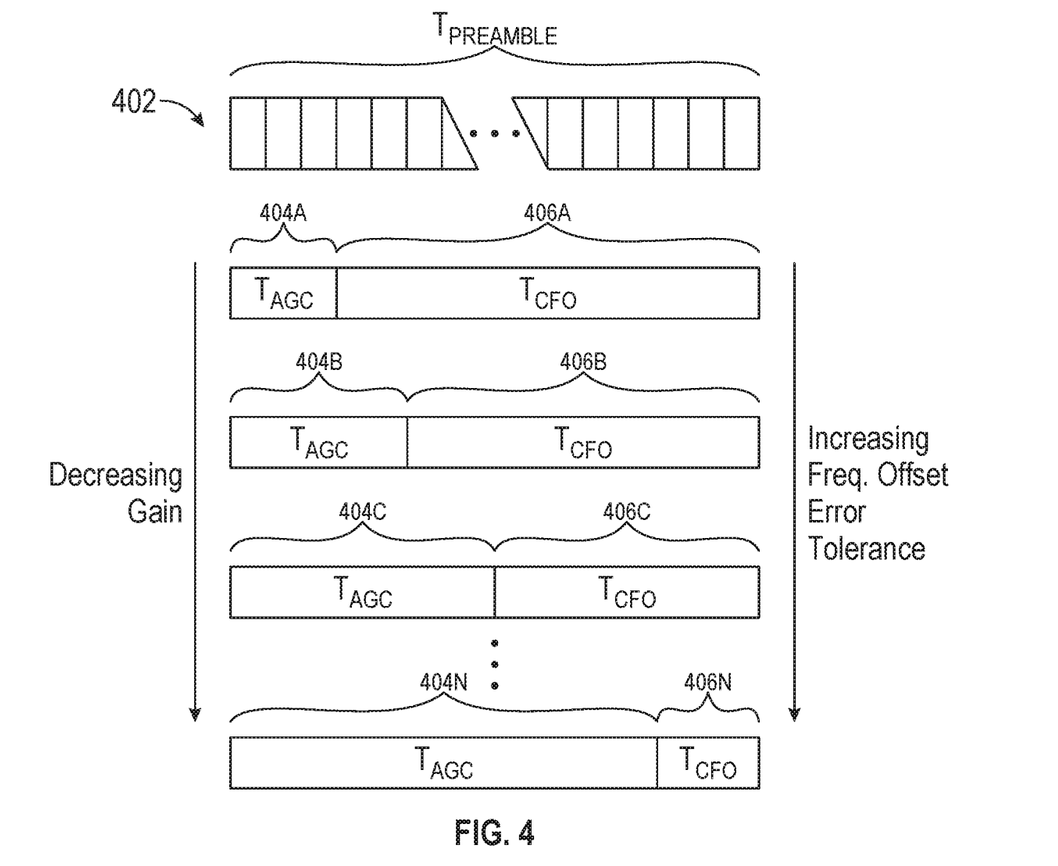
FIG. 4 illustrates generally an illustrative example of dynamic allocation of a portion of a data frame, such as a preamble, between automatic gain control (AGC) and carrier frequency offset (CFO) compensation.

FIG. 4 illustrates generally an illustrative example of dynamic allocation of a portion of a data frame, such as a preamble 402, between automatic gain control (AGC) and carrier frequency offset (CFO) compensation. The present inventors have recognized that in various use scenarios, such as in relation to wireless communication techniques, a duration of a preamble may be constrained to relatively few bit-durations (represented by rectangles in the preamble 402 shown in FIG. 4.) For example, according to various standards for use in the 2.4 gigahertz (GHz) band, a relatively short preamble duration comprising 8 bits to 16 bits may be used. Various calibrations or compensations, such as AGC and CFO compensation, are generally completed within the span of the preamble 402 duration, or before the end of the preamble 402 durations. For Gaussian frequency shift keyed applications, a total preamble duration may be around 8 microseconds, as an illustrative example.

In one approach, a bit pattern used for the preamble 402 can include an alternating pattern '1', '0','1', . . . , '1'. An error between the receiver center frequency and the transmitted center frequency can be manifested as an unwanted DC offset at the output of a phase detector. The compensation can include adding a DC value to compensate for the unwanted offset. The present inventors have recognized, among other things, that an interplay can exist between AGC and CFO behavior. If a total preamble 402 duration is fixed, and both AGC and CFO are performed before such a duration lapses, time budgeting can be performed so as to assign the relative durations spent on AGC and CFO dynamically. Generally, AGC settling time is dependent on input power. As an illustrative example, a higher input power will more likely require longer AGC settling time, because an initial gain setting will be too high. In the illustrative example of a CASK modulation scheme using a 2.4 GHz wireless receiver, a representative settling time (e.g., at 404N) for higher input power might be 6 or 7 microseconds, out of a total fixed preamble duration of 8 microseconds. In this illustration, this might leave only 1 microsecond available for CFO compensation (e.g., at 406N).

Referring to the illustrative example of FIG. 4, at low input power, such as close to a sensitivity limit of the receiver circuit, the AGC can settle quickly (<1 us) as shown illustratively at 404A. At the low input power level (and consequently lower signal-to-noise ration or SNR), more averaging time can be allocated to provide enhanced CFO compensation, such as shown at 406A. The present inventors have recognized, among other things, that CFO compensation can benefit from a greater symbol averaging duration when the receiver circuit is operated at close to its sensitivity limit. For higher input power, the AGC operation can consume more settling time whereas adequate carrier frequency offset compensation can be achieved more quickly. This is shown illustratively in FIG. 4 at region 404B and 404C (showing increasing AGC settling duration and correspondingly shortened CFO compensation duration). At higher input power levels (corresponding to longer $T_{AGC}$ durations) frequency offset error tolerance can be increased, such as permitting a shorter $T_{CFO}$ duration.

Generally, the duration of $T_{AGC}$ need not be established as a fixed value before either $T_{AGC}$ or $T_{CFO}$. For example, the duration $T_{AGC}$ can be extended as necessary during AGC operation until an appropriate gain is established. Then, $T_{AGC}$ can be terminated and $T_{CFO}$ can be triggered. AGC operation need not be performed exclusively within the duration of the preamble. For example, AGC operation may be triggered before the preamble commences. The techniques mentioned above are still applicable in such an example. A portion of the preamble 402 consumed by AGC operation can still be dynamically adjusted, even if AGC commences prior to the beginning of the preamble portion of a received signal. Generally, the preamble duration can be partitioned between AGC and CFO calibrations depending on the gain determined by AGC. If AGC settles to a low gain, more time can be allocated to CFO averaging. Conversely, if AGC settles to a high gain state, comparably less time is allocated to CFO compensation (e.g., fewer symbol durations). The techniques shown and described in relation to FIG. 3, FIG. 4, FIG. 5, or FIG. 6 can be performed such as using the apparatus shown in FIG. 2 or variations thereof.

Figure 5:
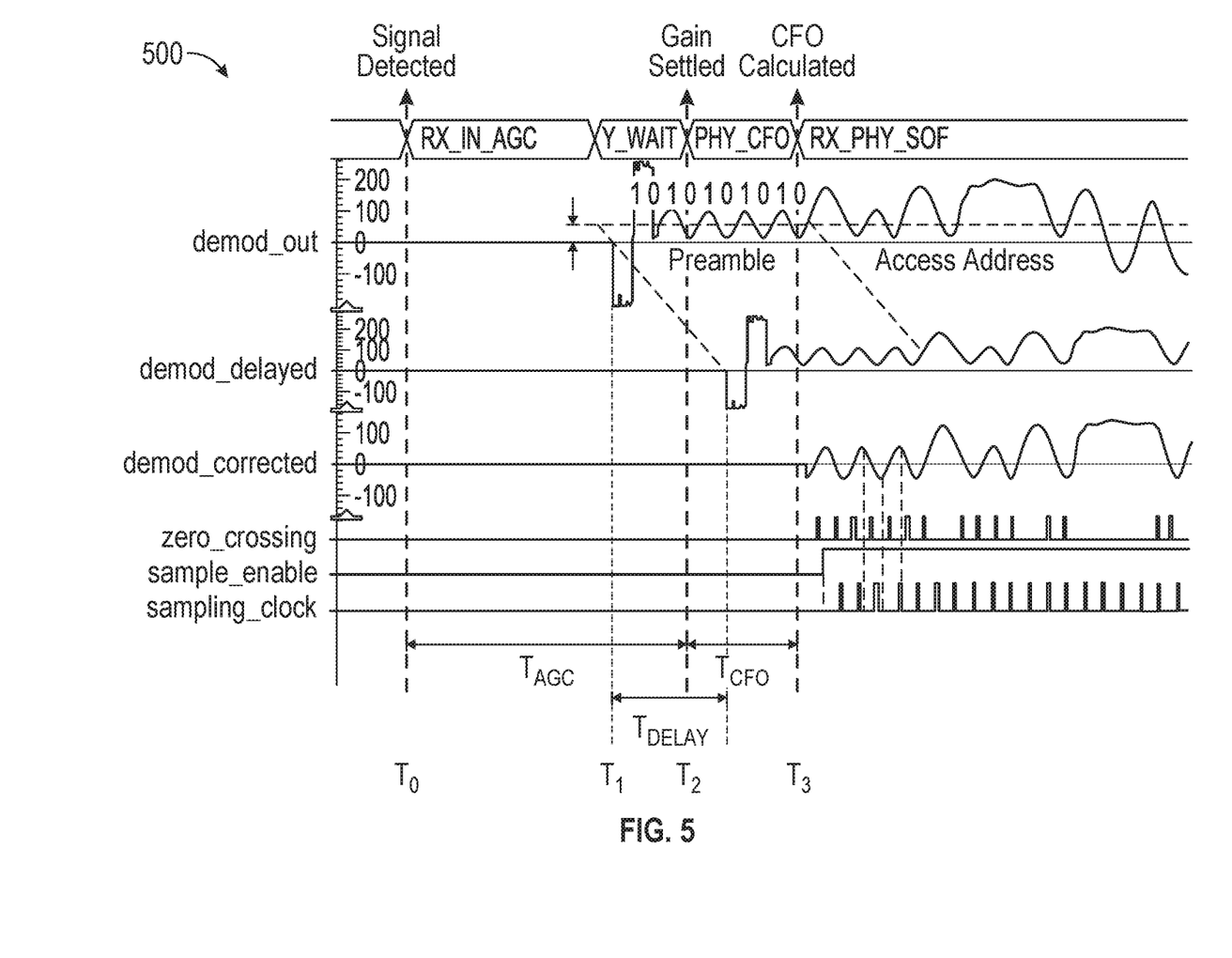
FIG. 5 illustrates generally an illustrative example of a simulated allocation of portions of a preamble duration to automatic gain control (AGC) and carrier frequency offset (CFO) compensation, along with using a delayed representation of an offset-compensated demodulated signal for detection of received digital data.

FIG. 5 illustrates generally an illustrative example 500 of a simulated allocation of portions of a preamble duration to automatic gain control (AGC) and carrier frequency offset (CFO) compensation, along with using a delayed representation of an offset-compensated demodulated signal for detection of received digital data. At a time $T_0$, a signal can be detected, and a duration for AGC can be initiated (e.g., "$T_{AGC}$"). At time a preamble duration can commence as shown in the signal "demod_out," representing an uncompensated output of a phase detector, for example. A portion of $T_{AGC}$ between $T_1$ and a time, $T_2$ when the receiver gain is settled can occur during the preamble duration. Completion of AGC settling at $T_2$ can trigger a CFO compensation duration $T_{CFO}$, such as during a remaining portion of the preamble.

At $T_3$, upon completion of the compensation duration, a delayed and corrected representation of the demodulated signal ("demod_corrected") can be provided to detection and decoding circuitry, and synchronization can be performed. As shown in FIG. 5, a DC offset indicated by the arrows in the demod_out waveform has been removed in the demod_corrected waveform. Activities such as zero-cross detection and sampling synchronization can be achieved using a delayed representation of the preamble in the demod_corrected waveform. Use of the delayed representation of the demodulated signal allows digital information present in the frame just after the preamble, such as the access address, to be detected and decoded without error because bit-detection synchronization has been achieved using the delayed, offset-corrected preamble segment.

Figure 6:
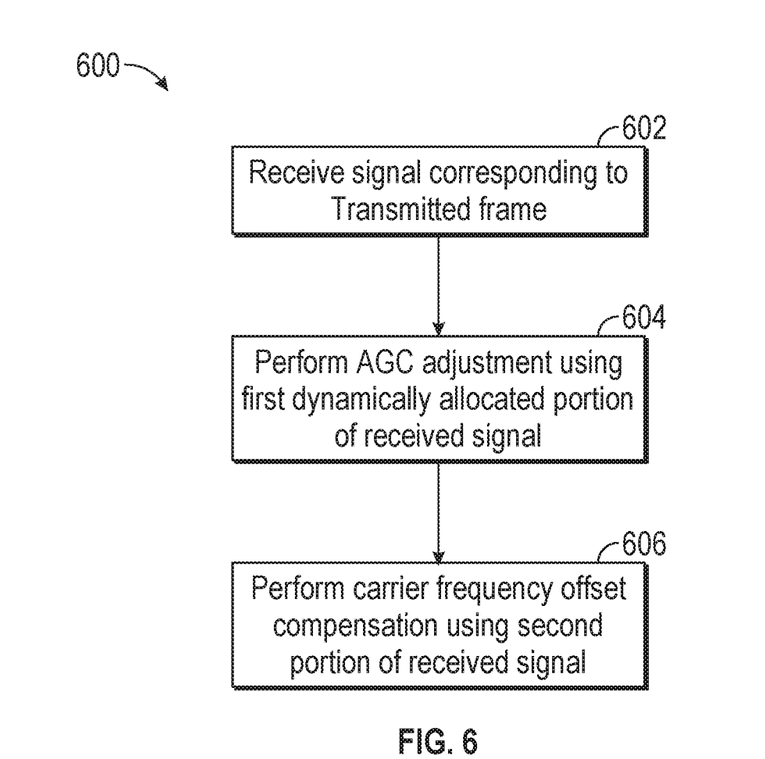
FIG. 6 illustrates generally a technique, such as a method, that can include performing automatic gain control (AGC) adjustment using a first dynamically-allocated portion of a received signal, and a performing carrier frequency offset (CFO) compensation using a second dynamically-allocated portion of the received signal.

FIG. 6 illustrates generally a technique 600, such as a method, that can include performing automatic gain control (AGC) adjustment using a first dynamically-allocated portion of a received signal at 604, and a performing carrier frequency offset (CFO) compensation using a second dynamically-allocated portion of the received signal at 606. The technique 600 can include receiving a signal corresponding to a transmitted frame at 602, such as using receiver circuit as shown in FIG. 2 or as mentioned elsewhere herein. AGC adjustment can begin, such as using a first dynamically-allocated portion of a received signal. The first dynamically-allocated portion of the received signal can include a preamble having a specified bit pattern, such as an alternating pattern. Once an appropriate AGC value has been established (e.g., AGC and gain selection have settled), a second portion of the received signal can be allocated to CFO compensation at 606. The second portion can include a portion of a preamble duration remaining after AGC has been performed. In cases where the AGC settling occurs more quickly, a greater proportion of the preamble duration can be allocated to CFO compensation, and vice versa. Use of the phrase "frame" or "packet" are interchangeable in the context of this disclosure. Such phrases can be used to refer to a received incoming signal including at least a training portion (such as a bit pattern included as a portion of preamble) and a data payload to be received and decoded.

Various Notes

Each of the non-limiting aspects above can stand on its own, or can be combined in various permutations or combinations with one or more of the other aspects or other subject matter described in this document.

The above detailed description includes references to the accompanying drawings, which form a part of the detailed description. The drawings show, by way of illustration, specific embodiments in which the invention can be practiced. These embodiments are also referred to generally as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more," In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

The claimed invention is:

1. A method for efficient carrier frequency offset (CFO) compensation in a digital communication receiver circuit, the method comprising:
   receiving a signal corresponding to a transmitted frame;
   during a first duration, performing an automatic gain adjustment on a receiver circuit using information extracted from a first portion of the received signal, the first duration varying dynamically in response to a strength of the received signal;
   during a second duration, performing a carrier frequency offset compensation using information extracted from a second portion of the received signal;
   wherein the first duration is established dynamically by the automatic gain adjustment; and
   wherein, in response to the dynamically-established first duration, the second duration is established dynamically.

2. The method of claim 1, wherein at least (1) the second duration is lengthened when the first duration is shortened or (2) the second duration is shortened when the first duration is lengthened.

3. The method of claim 1, wherein the first and second portions together correspond to a preamble of the transmitted frame.

4. The method of claim 1, wherein the first and second portions comprise an alternating bit pattern.

5. The method of claim 1, wherein the first and second portions comprise a total duration of between 8 and 16 bit duration intervals.

6. The method of claim 1, wherein the signal comprises a downconverted demodulated signal.

7. The method of claim 1, wherein the signal generated using a Gaussian frequency-shift keying (GFSK) modulation technique.

8. The method of claim 1, wherein the carrier frequency offset compensation includes adding a direct current (DC) value to or subtracting a direct current (DC) value from an output of a phase detector, the phase detector comprising a portion of the receiver circuit.

9. The method of claim 1, wherein the carrier frequency offset compensation includes providing a feedback signal to adjust a local oscillator (LO) frequency in response to a determined carrier frequency offset.

10. The method of claim 1, wherein a carrier frequency offset is more stringently compensated when a receiver circuit gain is increased; and
   wherein a carrier frequency offset is less stringently compensated when the receiver circuit gain is decreased.

11. The method of claim 1, wherein the second duration is decreased as a receiver circuit gain is decreased; and
   wherein the duration is lengthened as the receiver circuit gain is increased.

12. The method of claim 1, wherein the automatic gain adjustment includes decreasing a receiver circuit gain over the first duration.

13. The method of claim 1, comprising delaying a downconverted representation of the received signal before performing bit detection such that bit detection occurs on a delayed downconverted representation of the received signal having an offset compensation corresponding to the carrier frequency offset.

14. A method for efficient carrier frequency offset (CFO) compensation in a digital communication receiver circuit, the method comprising:
   receiving a signal corresponding to a transmitted frame including a preamble;
   dynamically allocating a first portion of a duration of the preamble to performing an automatic gain adjustment; and
   in response to dynamically allocating the first portion of the duration of the preamble, dynamically allocating a second portion of the duration of the preamble to performing a carrier frequency offset compensation;
   wherein a sum of the first and second durations correspond to the preamble duration; and
   wherein at least (1) the second duration is lengthened when the first duration is shortened or (2) the second duration is shortened when the first duration is lengthened.

15. The method of claim 14, wherein the signal comprises a downconverted demodulated signal.

16. The method of claim 14, wherein the signal is generated using a Gaussian frequency-shift keying (GFSK) modulation technique.

17. A receiver circuit for a communication system having an adjustable receive gain and a received carrier frequency offset correction scheme, the receiver circuit comprising:

an amplifier circuit configured to receive a signal corresponding to a transmitted frame;
an automatic gain control (AGC) circuit coupled to the amplifier circuit and configured to automatically adjust a gain of the amplifier circuit using information obtained from a first portion of the signal received by the amplifier circuit;
a carrier frequency offset (CFO) compensation circuit configured to perform carrier frequency offset compensation using information obtained from a second portion of the signal received by the amplifier circuit;
wherein the AGC circuit is configured to dynamically establish a first duration corresponding to the first portion, and wherein the CFO compensation circuit is configured to dynamically establish a second duration corresponding to the second portion of the received signal in response to the dynamically-established first duration; and
wherein at least (1) the second duration is lengthened when the first duration is shortened or (2) the second duration is shortened when the first duration is lengthened.

18. The receiver circuit of claim 17, wherein the first and second portions together correspond to a preamble of the transmitted frame.

19. The receiver circuit of claim 17, wherein the CFO compensation circuit is triggerable to perform CFO compensation in response to a signal from the AGC circuit indicating that the automatic gain adjustment has been completed.

20. The receiver circuit of claim 17, comprising:
an analog-to-digital converter circuit communicatively coupled to the amplifier circuit; and
a phase detection circuit coupled to an output of analog-to-digital converter circuit;
wherein the carrier frequency offset (CFO) compensation circuit is configured to perform the carrier frequency offset compensation by adjusting an output of the phase detection circuit using information obtained from the second portion of the signal received by the amplifier circuit.

21. The receiver circuit of claim 17, wherein the CFO compensation circuit is configured to perform carrier frequency offset compensation more stringently when the amplifier circuit gain is increased by the AGC circuit; and
wherein the CFO compensation circuit is configured to perform carrier frequency offset compensation less stringently when the amplifier circuit gain is decreased by the AGC circuit.

* * * * *